(12) United States Patent
Wilhide et al.

(10) Patent No.: US 8,742,605 B1
(45) Date of Patent: Jun. 3, 2014

(54) METHOD FOR AIRCRAFT ENGINE START USING SYNCHRONOUS GENERATOR AND CONSTANT SPEED DRIVE

(71) Applicant: Hamilton Sundstrand Corporation, Windsor Locks, CT (US)

(72) Inventors: Matthew L. Wilhide, Cherry Valley, IL (US); Glenn C. Lemmers, Jr., Loves Park, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 13/761,706

(22) Filed: Feb. 7, 2013

(51) Int. Cl.
*B60L 11/02* (2006.01)
*F02N 11/08* (2006.01)
*F02B 63/04* (2006.01)
*H02K 7/10* (2006.01)
*H02K 7/18* (2006.01)

(52) U.S. Cl.
USPC ............. 290/30 R; 290/1 C; 290/31; 290/34; 290/40 A; 290/40 C; 290/52

(58) Field of Classification Search
USPC ........... 290/1 C, 30 R, 31, 34, 40 A, 40 C, 52
See application file for complete search history.

(56) References Cited

U.S. PATENT DOCUMENTS

| | | | | |
|---|---|---|---|---|
| 4,382,188 A | * | 5/1983 | Cronin | 290/1 C |
| 4,401,938 A | * | 8/1983 | Cronin | 322/29 |
| 4,488,053 A | * | 12/1984 | Cronin | 290/40 |
| 4,488,198 A | * | 12/1984 | Christen et al. | 361/20 |
| 4,743,776 A | | 5/1988 | Baehler et al. | 290/31 |
| 4,772,802 A | | 9/1988 | Glennon et al. | 290/31 |
| 4,786,852 A | | 11/1988 | Cook | 322/10 |
| 4,817,459 A | | 4/1989 | Erikson et al. | 475/13 |
| 4,868,406 A | | 9/1989 | Glennon et al. | 290/1 R |
| 6,462,429 B1 | * | 10/2002 | Dhyanchand et al. | 290/31 |
| 6,677,685 B2 | * | 1/2004 | Pfleger et al. | 290/40 C |
| 6,707,205 B2 | | 3/2004 | Johnsen | 310/114 |
| 6,825,575 B1 | * | 11/2004 | Edelson | 290/40 C |
| 6,838,778 B1 | | 1/2005 | Kandil et al. | 290/31 |
| 7,105,937 B2 | | 9/2006 | Hoppe et al. | 290/38 R |
| 7,105,938 B2 | * | 9/2006 | Edelson | 290/40 A |
| 7,175,554 B2 | | 2/2007 | Van Spijk et al. | 474/46 |
| 7,250,688 B2 | * | 7/2007 | Thomson et al. | 290/34 |
| 7,405,542 B1 | | 7/2008 | McAvoy | 322/14 |
| 7,434,406 B2 | | 10/2008 | Herlihy et al. | 60/788 |
| 7,514,806 B2 | * | 4/2009 | Xu et al. | 290/31 |
| 7,687,927 B2 | * | 3/2010 | Shander et al. | 290/7 |
| 7,805,947 B2 | | 10/2010 | Moulebhar | 60/787 |
| 7,905,813 B2 | * | 3/2011 | Edelson et al. | 477/110 |
| 8,039,983 B2 | | 10/2011 | Cote et al. | 290/52 |
| 8,049,386 B2 | | 11/2011 | Vanderzyden | 310/90 |
| 8,250,854 B2 | | 8/2012 | Sharpe | 60/269 |

(Continued)

*Primary Examiner* — Pedro J Cuevas
(74) *Attorney, Agent, or Firm* — Cantor Colburn LLP

(57) ABSTRACT

A method of starting an aircraft engine is provided. The method includes providing motive power from a generator for starting an engine during an engine start mode and deriving electrical power by way of the generator from rotation of the engine during a generate mode, transmitting the motive power from the generator to the engine during the engine start mode by way of a constant speed drive (CSD) and regulating a frequency of the electrical power output from the generator during the generate mode by way of the CSD and coupling a generator and CSD controller (GCC) to the generator and the CSD and operating the generator and the CSD by the GCC to execute at least the engine start mode and the generate mode.

18 Claims, 4 Drawing Sheets

(56) References Cited

U.S. PATENT DOCUMENTS

| | | |
|---|---|---|
| 8,269,449 B2 * | 9/2012 | Bjerknes et al. ............. 318/723 |
| 8,304,927 B2 | 11/2012 | Cote et al. ..................... 290/52 |
| 2005/0116474 A1 * | 6/2005 | Edelson ..................... 290/40 A |
| 2006/0012179 A1 * | 1/2006 | Thomson et al. ............. 290/34 |
| 2006/0249956 A9 * | 11/2006 | Thomson et al. ............. 290/34 |
| 2008/0238108 A1 * | 10/2008 | Edelson et al. ............. 290/40 C |
| 2008/0303280 A1 * | 12/2008 | Xu et al. ........................ 290/31 |
| 2009/0127855 A1 * | 5/2009 | Shander et al. ................ 290/7 |
| 2010/0133813 A1 * | 6/2010 | Cote et al. ..................... 290/32 |
| 2012/0091716 A1 * | 4/2012 | Cote et al. ..................... 290/46 |
| 2012/0313372 A1 * | 12/2012 | Bjerknes et al. ............. 290/34 |

* cited by examiner

Basis:
$\sin(x-y) = \sin(x) * \cos(y) - \cos(x) * \sin(y)$
x = Source_Angle
y = Est_Angle

METHOD FOR AIRCRAFT ENGINE START USING SYNCHRONOUS GENERATOR AND CONSTANT SPEED DRIVE

BACKGROUND OF THE INVENTION

The subject matter disclosed herein relates to a method used for starting an aircraft engine using a synchronous generator and a constant speed drive.

Many aircraft in service have a synchronous generator coupled to each engine through a constant speed drive (CSD). As each of the engines turn, the corresponding CSD controls an associated synchronous generator to produce a constant frequency output current that can be used in various aircraft systems. For example, a synchronous generator may be employed to provide power to the air conditioning system or other electrical systems on a commercial aircraft.

Given the power rating required to drive these electrical loads, most synchronous generators should be capable of starting the aircraft engine. The problem with this configuration is that starting an aircraft engine requires that the engine spins at varying speed ranges outside the narrow frequency band (i.e., about 400 Hz) of commonly used CSDs. As a result, in most aircraft designs, an air turbine starter is used to start the engine as there does not exist a method to vary the speed output from the CSD.

BRIEF DESCRIPTION OF THE INVENTION

According to one aspect of the invention, a method of starting an aircraft engine is provided. The method includes providing motive power from a generator for starting an engine during an engine start mode and deriving electrical power by way of the generator from rotation of the engine during a generate mode, transmitting the motive power from the generator to the engine during the engine start mode by way of a constant speed drive (CSD) and regulating a frequency of the electrical power output from the generator during the generate mode by way of the CSD and coupling a generator and CSD controller (GCC) to the generator and the CSD and operating the generator and the CSD by the GCC to execute at least the engine start mode and the generate mode.

According to another aspect of the invention, a starter-drive generator (SDG) system for starting an aircraft engine is provided and includes a generator and a constant speed drive (CSD) configured to perform a main engine start through the use of an external power supply and to perform a frequency control function.

According to yet another aspect of the invention, a starter-drive generator (SDG) system for starting an aircraft engine is provided and includes a generator to provide motive power for starting an engine during engine start mode and to derive electrical power from rotation of the engine during generate mode, a constant speed drive (CSD) to transmit the motive power from the generator to the engine during the engine start mode and to transmit the motive power from the engine to the generator during generate mode and a generator and CSD controller (GCC) coupled to the generator and the CSD, which is configured to regulate the power between the generator and the engine to execute at least the engine start mode and the generate mode.

These and other advantages and features will become more apparent from the following description taken in conjunction with the drawings.

BRIEF DESCRIPTION OF THE DRAWINGS

The subject matter, which is regarded as the invention, is defined and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

The description provided below relates to a starter-drive generator (SDG) system used for starting an aircraft engine using a synchronous generator and a constant speed drive (CSD). One or more embodiments disclosed herein may allow a CSD to perform main engine start through the use of an external constant frequency power supply such as a ground cart, an auxiliary power unit (APU), etc., in addition to performing its typical frequency control function.

Figure 1:
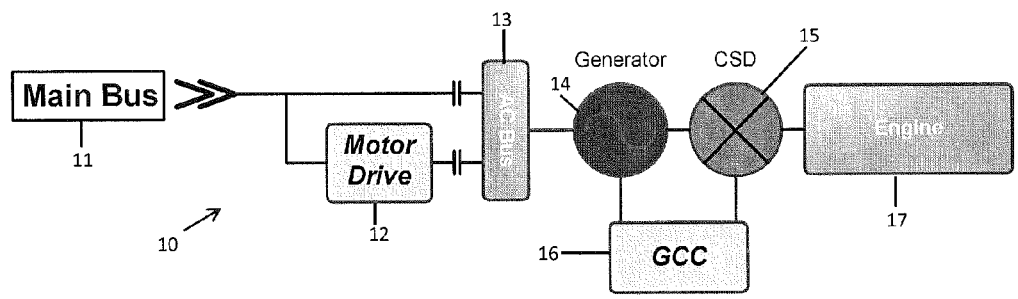
FIG. 1 is a schematic diagram of a starter-drive generator (SDG) system in accordance with embodiments.

With reference to FIG. 1, an SDG system 10 is provided for use with an aircraft or another suitable rotor-machine. The SDG system 10 includes a main bus 11, a motor drive 12, an AC bus 13, a generator 14, a CSD 15, a generator and CSD controller (GCC) 16 and an engine 17. As shown in FIG. 1, one side of the AC bus 13 is connected to outputs of the main bus 11 and the motor drive 12. The other side of the AC bus 13 is connected to the generator 14 with the CSD 15 and the engine 17 connected to the generator 14 is series. The GCC 16 is disposed in parallel with the generator 14 and the CSD 15.

The main bus 11 may be formed as a 3-phase AC, constant frequency bus. During a start mode of the engine 17, the main bus 11 may be connected to an external power supply (e.g., ground cart, second generator, APU, etc.). During a generate mode, the main bus may be connected to normal aircraft loads (e.g., air conditioning and electrical systems). The motor drive 12 is used to spin the generator 14 to a synchronous speed, which is close to the frequency of the external power supply. The motor drive 12 may include an active rectifier at a front end thereof and a 6-switch inverter on the back end. When the motor drive 12 is not employed for engine 17 starting operations, the motor drive 12 may be used for a secondary function such as an environmental control system (ECS) of the aircraft. The AC bus 13 is formed as a "two-sided" panel filled with contactors and is used to re-configure power flow within the aircraft.

The generator 14 may be a wound field synchronous generator and is configured to provide motive power for starting the engine 17 during engine start mode and to derive electrical power from the engine 17 during generate mode. During engine start, the generator 14 is used as a motor for the engine 17 through an ignition sequence thereof. During the generate mode, the generator 14 is used create electrical power based on rotational energy received from the engine 17. The CSD 15 includes a hydraulic gearbox used to regulate shaft torque between the engine 17 and the generator 14. The CSD 15 can be configured in an output or an input summed configuration and uses two servo valves to control torque transfer. The GCC 16 is configured to perform synchronous generator excitation control and to perform servo valve control for the CSD 15. During the engine 17 start mode, the GCC 16 regulates an exciter field in the generator 14 in order to help regulate torque produced by the generator 14 and the CSD 15. During the engine 17 generate mode, the GCC 16 regulates the exciter field to control generator 14 terminal voltage.

As noted above, the SDG system 10 may be configured to operate in two modes of operation: the start mode and the generate mode. In the start mode, external power supplied from the external constant frequency power supply via the main bus 11 is used to spin the engine 17 up to light-off speed. In the generate mode, the SDG system 10 functions in a similar fashion as existing CSD driven generators.

For the start mode, system initialization proceeds as follows. In a system initialization operation, the AC bus 13 configures its contactors such that the motor drive 12 is connected to the generator 14 and the main bus 11 is disconnected from the generator 14. The GCC 16 supplies start mode excitation to the generator 14 and controls the engine shaft speed to zero RPM in accordance with an algorithm that will be described below. The motor drive 12 then performs a precharge sequence to charge a DC link and enables a phase-lock-loop (PLL) in order to calculate a frequency and phase of a power source.

In a synchronization operation, the motor drive 12 starts an active rectifier to generate a DC link bus. The active rectifier may include standard voltage and current regulators. The motor drive 12 also starts a phase regulator, which controls the speed of the generator 14 in order to achieve the desired phase command. In a transition to main bus 11 operation, once the generator 14 has achieved the desired phase command with respect to the main bus 11, the motor drive 12 is disabled, the AC bus 13 opens the motor drive 12 contactor and the AC bus 13 closes the main bus 11 contactor. In an engine 17 stating operation, with the main bus 11 contactor closed, the GCC 16 begins to accelerate the engine 17 by commanding the CSD 15 to begin applying torque to the engine 17 shaft. The GCC 16 will control the engine speed as required to start the engine 17. Finally, in a transition to generate operation, when the engine 17 achieves sufficient speed that torque assist is no longer required, the GCC 16 de-excites the generator 14 and re-configures the CSD 15 for generate mode. In the generate mode, the SDG system 10 function in a similar manner as conventional CSD driven generators.

Figure 2:
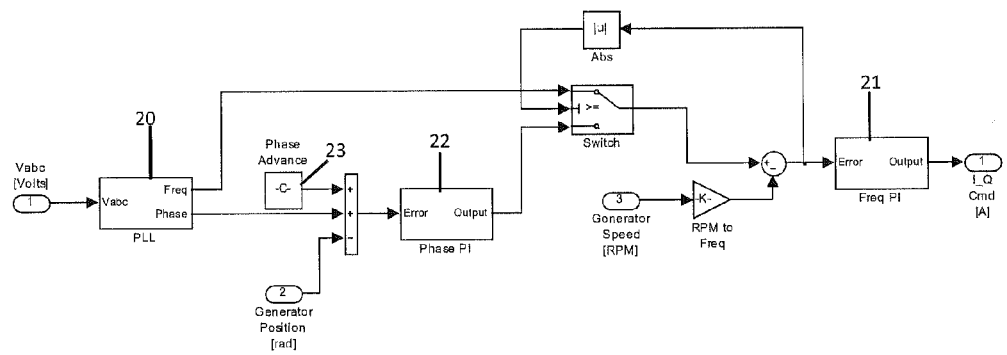
FIG. 2 is a top level schematic of a phase synchronization algorithm.
Figure 3:
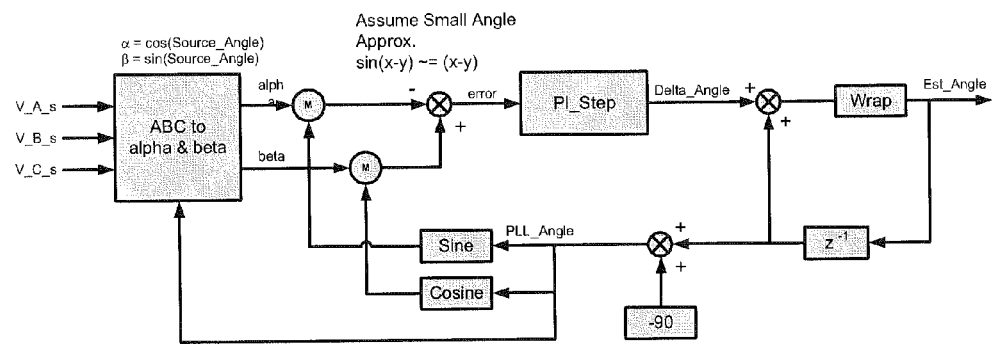
FIG. 3 is a schematic diagram of a phase lock loop (PLL) operation algorithm.

With reference to FIGS. 2 and 3, control algorithms for executing the operations described above will now be described. FIG. 2 is a top level schematic of a phase synchronization algorithm. The phase synchronization algorithm includes a phase lock loop (PLL) 20, a frequency regulator 21 (i.e., a first or frequency PI controller) and a phase regulator 22 (i.e., a second or phase PI controller). The PLL 20 measures the AC voltage source and calculates the corresponding AC source frequency and phase. These calculated values are used as commands for the frequency regulator 21 and the phase regulator 22. The frequency regulator 21 is thus enabled when a frequency error is greater than 5 Hz. Once the generator frequency is within 5 Hz of the command, the phase regulator 22 takes over and adjusts frequency in order to maintain the desired phase command. The desired phase command is adjusted by a phase advance term 23. The phase advance term 23 is based on the amount of phase change (due to the generator 14 slowing down) that is expected during the power source transition from the motor drive 12 to the main bus 11.

A PLL operation algorithm is presented in FIG. 3. As shown in FIG. 3, the PLL 20 reads the input AC voltages and calculates both the frequency of the AC source and the phase (or electrical angle) of the AC source.

Figure 4:
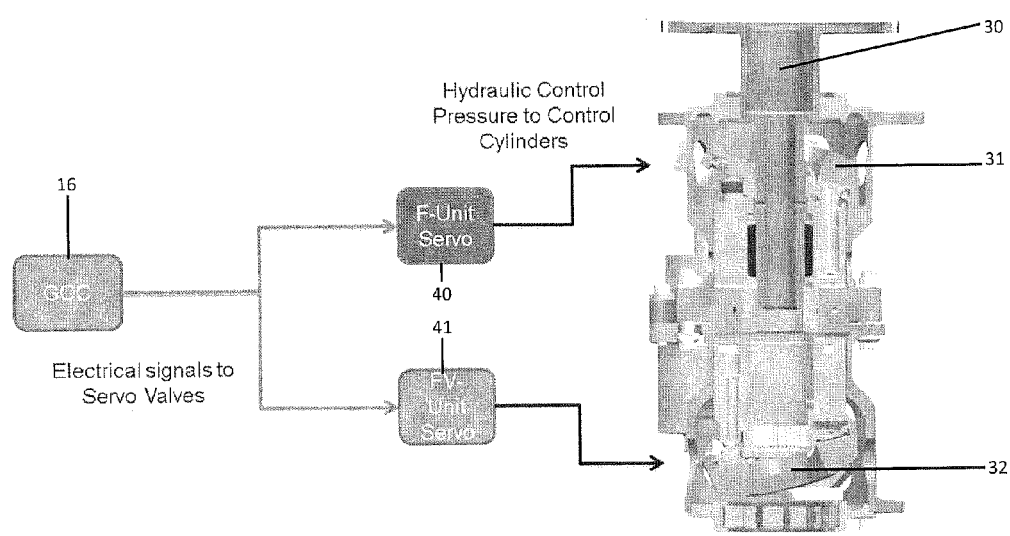
FIG. 4 is a schematic diagram of a constant speed drive (CSD) with two wobbler plates in accordance with embodiments.
Figure 5:
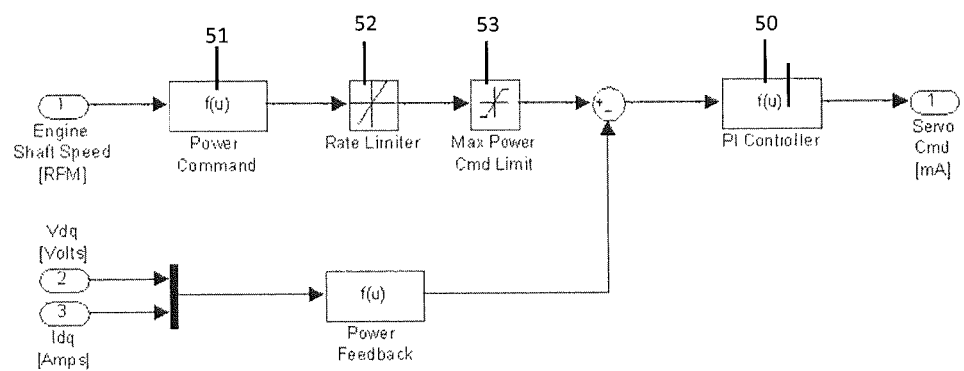
FIG. 5 is a schematic diagram for illustrating a control law of the CSD of FIG. 4.

With reference to FIGS. 4 and 5, control algorithms and operations of the CSD 15 are shown. As shown in FIG. 4, the CSD 15 includes a rotatable shaft 30 that is coupled to the generator 14 and the engine 17, a V-block wobbler 31 and an FV-block wobbler 32. The V-block wobbler 31 and the FV-block wobbler 32 cooperatively operate to control a rotation speed of the rotatable shaft 30. The V-Block wobbler 31 is operably coupled to the F-unit servo 40 and the FV-block wobbler 32 is operably coupled to the FV-unit servo 41. Both the F-unit servo 40 and the FV-unit servo are operably coupled to the GCC 16. During operation, the GCC 16 outputs electrical signals to the F-unit servo 40 and the FV-unit servo 41. Those electrical signals are converted into hydraulic control pressures that are transmitted to the V-block wobbler 31 and that FV-block wobbler 32, respectively.

That is, the GCC 16 is responsible for controlling the torque transferred through the CSD 15. The GCC 16 performs this by controlling the F-unit servo 40 and the FV-unit servo 41, which regulate the flow of hydraulic fluid within the CSD 15. For the purposes of the present description, the GCC 16 controls the CSD 15 through the synchronization mode, the engine start mode, the transition to generate mode and the generate mode.

During the synchronization mode, the GCC 16 attempts to regulate the engine shaft speed (i.e., the rotatable shaft 30) to zero RPM. This is done by controlling the FV-block wobbler 32 (which is coupled to the rotatable shaft 30 via a differential trim ring gear) by way of the FV-unit servo 41. This is necessary as the engine shaft may be windmilling and the motor controller may not be sized sufficiently to overcome this windmilling torque.

During the engine start mode for an input summed CSD configuration, the GCC 16 uses the FV-unit servo 41 and the F-unit servo 40 to place the FV-block wobbler 32 on its start mode hard stop and the V-block wobbler 31 on its fully de-stroked wobbler stop, respectively. The V-block wobbler 31 is then controlled according to the control law shown in FIG. 5 while the FV-block wobbler 32 is maintained on its start mode wobbler hard stop.

During the engine start mode for an output summed CSD configuration, the FV-block wobbler 32 is placed at a neutral (0°) wobbler angle initially and the V-block wobbler 31 is placed on its fully de-stroked wobbler stop. During the first portion of the engine start mode, the FV-block wobbler is controlled according to the control law shown in FIG. 5 while the V-block wobbler 31 is maintained on its de-stroke hard stop. Once the FV-block wobbler 32 hits its start mode wobbler hard stop, the V-block wobbler is controlled according to the control law shown in FIG. 5 while the FV-block wobbler 32 is maintained on its start mode hard stop.

As shown in FIG. 5, the servo position of each of the F-unit servo 31 and the FV-unit servo 32 is regulated using a respective PI controller 50. The input to the PI controller 50 is the calculated error between the power command 51 and the power measured in the generator 14. The power command 51 is based on the engine shaft speed and is both rate limited by rate limiter 52 and saturated to a maximum limit by max power command limit 53. The feedback power provided by feedback loop 54 is calculated using the dq voltage and current measured by the GCC 16.

During the transition to generate mode, the GCC 16 will stroke the F-block wobbler 31 to the generate mode hard stop with the V-block wobbler 32 positioned on the fully de-stroked hard stop in preparation for the generate mode. In the generate mode, the GCC 16 will regulate the V-block wobbler 31 to control the terminal frequency as is done in conventional IDG/CSD systems. The FV-block wobbler 32 will remain on its generate mode hard stop as it is not used during the generate mode.

As a result of the use of the invention as described above, an air turbine start and engine pad can be removed to thus reduce aircraft weight, an improved start capability is provided as the engine start is electrically controlled as opposed to being controlled by a pneumatic system, the use of a constant frequency bus, as used on many aircraft and ground power carts, is permitted and a need for additional controllers on the aircraft is eliminated as functions are implemented into existing controllers.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of starting an aircraft engine, the method comprising:
    providing motive power from a generator for starting an engine during an engine start mode and deriving electrical power by way of the generator from rotation of the engine during a generate mode;
    transmitting the motive power from the generator to the engine during the engine start mode by way of a constant speed drive (CSD) and regulating a frequency of the electrical power output from the generator during the generate mode by way of the CSD; and
    coupling a generator and CSD controller (GCC) to the generator and the CSD and operating the generator and the CSD by the GCC to execute at least the engine start mode and the generate mode.

2. The method according to claim 1, disposing a motor drive configured to spin the generator to a synchronous speed.

3. The method according to claim 1, disposing an AC bus configured to re-configure power flow within the aircraft.

4. The method according to claim 1, further comprising operating the GCC to regulate torque produced by the generator and the CSD during the engine start mode and to control a generator terminal voltage during the generate mode.

5. A starter-drive generator (SDG) system for starting an aircraft engine, the system comprising:
    a generator; and
    a constant speed drive (CSD) configured to perform a main engine start through the use of an external power supply and to perform a frequency control function.

6. The SDG system according to claim 5, wherein the generator comprises a synchronous generator.

7. The SDG system according to claim 5, wherein the external power supply comprises an external constant frequency power supply.

8. The SDG system according to claim 5, wherein the external power supply comprises at least one of a ground cart and an auxiliary power unit.

9. The SDG system according to claim 5, further comprising a main bus, which is connectable to the external power supply during an engine start mode and to normal aircraft loads during a generate mode.

10. The SDG system according to claim 5, further comprising a motor drive configured to spin the generator to a synchronous speed.

11. The SDG system according to claim 5, further comprising an AC bus configured to re-configure power flow within the aircraft.

12. The SDG system according to claim 5, wherein the CSD comprises:
    a V-block wobbler and an FV-block wobbler;
    an F-unit servo to control an operation of the V-block wobbler; and
    an FV-unit servo to control an operation of the FV-block wobbler.

13. The SDG system according to claim 5, further comprising a generator and CSD controller (GCC), which is configured to regulate torque produced by the generator and the CSD during an engine start mode and to control a generator terminal voltage during a generate mode.

14. A starter-drive generator (SDG) system for starting an aircraft engine, the system comprising:
    a generator to provide motive power for starting an engine during an engine start mode and to derive electrical power from rotation of the engine during a generate mode;
    a constant speed drive (CSD) to transmit the motive power from the engine to the generator during the generate mode; and
    a generator and CSD controller (GCC) coupled to the generator and the CSD, which is configured to regulate transmission of the motive power between the generator and the engine to execute at least the engine start mode and the generate mode.

15. The SDG system according to claim 14, further comprising a motor drive configured to spin the generator to a synchronous speed.

16. The SDG system according to claim 14, further comprising an AC bus configured to re-configure power flow within the aircraft.

17. The SDG system according to claim 14, wherein the CSD comprises:
    a V-block wobbler and an FV-block wobbler;
    an F-unit servo to control an operation of the V-block wobbler; and
    an FV-unit servo to control an operation of the FV-block wobbler.

18. The SDG system according to claim 14, further comprising a generator and CSD controller (GCC), which is configured to regulate torque produced by the generator and the CSD during the engine start mode and to control a generator terminal voltage during the generate mode.

* * * * *